(12) United States Patent
Greist et al.

(10) Patent No.: US 11,519,839 B2
(45) Date of Patent: Dec. 6, 2022

(54) PRESSURE PROBE INCLUDING MULTIPLE ORFICES FOR MEASURING AIR PRESSURE IN VARYING AIRFLOW SYSTEMS

(71) Applicant: Lennox Industries Inc., Richardson, TX (US)

(72) Inventors: Henry Greist, Gainesville, FL (US); Sanjeev Hingorani, Gainesville, FL (US)

(73) Assignee: Lennox Industries Inc.

( * ) Notice: Subject to any disclaimer, the term of this patent is extended or adjusted under 35 U.S.C. 154(b) by 43 days.

(21) Appl. No.: 17/194,412

(22) Filed: Mar. 8, 2021

(65) Prior Publication Data

US 2021/0190657 A1    Jun. 24, 2021

Related U.S. Application Data

(62) Division of application No. 15/860,087, filed on Jan. 2, 2018, now Pat. No. 10,955,324.

(51) Int. Cl.
| | |
|---|---|
| *G01L 19/00* | (2006.01) |
| *G01N 7/10* | (2006.01) |
| *F24F 11/49* | (2018.01) |
| *G01L 13/00* | (2006.01) |
| *F24F 140/10* | (2018.01) |
| *F24F 11/00* | (2018.01) |

(52) U.S. Cl.
CPC ............. *G01N 7/10* (2013.01); *F24F 11/49* (2018.01); *G01L 13/00* (2013.01); *G01L 19/0023* (2013.01); *F24F 2011/0006* (2013.01); *F24F 2140/10* (2018.01)

(58) Field of Classification Search
None
See application file for complete search history.

(56) References Cited

U.S. PATENT DOCUMENTS

| | | | |
|---|---|---|---|
| 4,912,973 A | | 4/1990 | Milewski et al. |
| 6,149,515 A | * | 11/2000 | Van Becelaere ...... F24F 13/075 73/198 |
| 6,520,029 B1 | | 2/2003 | Roine |
| 6,928,884 B1 | * | 8/2005 | Pearson ................... G01F 1/46 73/861.65 |
| 8,024,982 B2 | | 9/2011 | Pettit et al. |
| 8,733,180 B1 | | 5/2014 | England et al. |
| 9,606,137 B2 | * | 3/2017 | Jacob ...................... G01P 5/165 |
| 2015/0090050 A1 | * | 4/2015 | Wiklund ................... G01F 1/37 73/861.65 |

\* cited by examiner

*Primary Examiner* — Lisa M Caputo
*Assistant Examiner* — Nigel H Plumb
(74) *Attorney, Agent, or Firm* — Shackelford, Bowen, McKinley & Norton, LLP

(57) ABSTRACT

A pressure probe includes a tube having an output end, an internal passage, an axial run, and pressure orifices axially aligned along a downstream side of the axial run. The pressure orifices are in communication with the output end through the internal passage and an upstream side of the axial run that is opposite from the downstream side of the axial run and does not include a pressure orifice. The downstream side is perpendicular to airflow.

19 Claims, 3 Drawing Sheets

PRESSURE PROBE INCLUDING MULTIPLE ORFICES FOR MEASURING AIR PRESSURE IN VARYING AIRFLOW SYSTEMS

CROSS-REFERENCE TO RELATED APPLICATION

This application is a divisional of U.S. patent application Ser. No. 15/860,087, filed Jan. 2, 2018. U.S. patent application Ser. No. 15/860,087 is incorporated herein by reference.

TECHNICAL FIELD

This application is directed, in general, to pressure probes and measuring pressure in airflow and more specifically to measuring air pressure in the varying airflow of climate control systems.

BACKGROUND

This section provides background information to facilitate a better understanding of the various aspects of the disclosure. It should be understood that the statements in this section of this document are to be read in this light, and not as admissions of prior art.

Heating, ventilating and air conditioning (HVAC) systems can be used to regulate the environment within an enclosed space. Typically, an air blower is used to pull air from the enclosed space into the HVAC system through ducts and push the air back into the enclosed space through additional ducts after conditioning the air (e.g., heating, cooling or dehumidifying the air). Various types of HVAC systems may be used to provide conditioned air for enclosed spaces. For example, some HVAC units are located on the rooftop of a commercial building. These so-called rooftop units, or RTUs, typically include one or more blowers and heat exchangers to heat and/or cool the building, and baffles to control the flow of air within the RTU. Some RTUs also include an air-side economizer that allows to selectively provide fresh outside air to the RTU or to recirculate exhaust air from the building back through the RTU to be cooled or heated again.

When the enthalpy of the fresh air is less than the enthalpy of the recirculated air, conditioning the fresh air may be more energy-efficient than conditioning the recirculated air. In this case the economizer may exhaust a portion of the stale air and replace the vented air with outside air. When the outside air is both sufficiently cool and sufficiently dry it may be possible that no additional conditioning of the outside air is needed. In this case the economizer may draw a sufficient quantity of outside air into the building to provide all the needed cooling. In some installations an energy recovery ventilator (ERV) may be used to pre-condition the fresh air demanded by the RTU. The ERV may include, e.g., an enthalpy exchange zone to transfer heat and/or humidity between an incoming fresh air stream and an outgoing exhaust air stream. The enthalpy exchange zone can include one or multiple enthalpy wheels. ERVs are typically equipped with fresh-air and return air filters that allow energy recovery from areas, such as kitchens and smoking area, that have a high level of contaminants but can still benefit from fresh-air.

HVAC systems may rely on pressures sensors installed in airflow ducts to monitor and/or control system conditions. These sensors can malfunction and give inaccurate pressure readings for example due to dust accumulation and clogging of the probe.

SUMMARY

In an example a pressure probe includes a tube having an output end, an internal passage, an axial run and pressure orifices axially aligned along a downstream side of the axial run and in communication with the output end through the internal passage. According to an aspect an upstream side of the axial run opposite from the downstream side of the axial run does not have a pressure orifice.

An example climate control system includes a structure forming an airflow channel, a unit disposed in the structure across which airflow passes in a downstream direction and a pressure sensor having a first pressure probe positioned in the airflow channel upstream of the unit and a second pressure probe positioned in the airflow channel downstream of the unit, where each of the first and the second pressure probes includes a tube having an output end, an internal passage, an axial run and pressure orifices axially aligned along a downstream side of the axial run and the axial run is positioned laterally across the airflow channel with the downstream side of the axial run and the pressure orifices oriented in the downstream direction.

An example method of monitoring a condition of a unit in a climate control system includes obtaining differential static pressure data of an airflow passing in a downstream direction across a unit disposed in an airflow channel of a climate control system, the differential static pressure data obtained by a first pressure probe positioned upstream of the unit and a second pressure probe positioned downstream of the unit and determining a unit condition based on the obtained differential static pressure data; where each of the first and the second pressure probes includes a tube having an output end, an internal passage, an axial run and pressure orifices axially aligned along a downstream side of the axial run and the axial run is positioned laterally across the airflow channel with the downstream side of the axial run and the pressure orifices oriented in the downstream direction.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion. As will be understood by those skilled in the art with benefit of this disclosure, elements and arrangements of the various figures can be used together and in configurations not specifically illustrated without departing from the scope of this disclosure.

DETAILED DESCRIPTION

Figure 1:
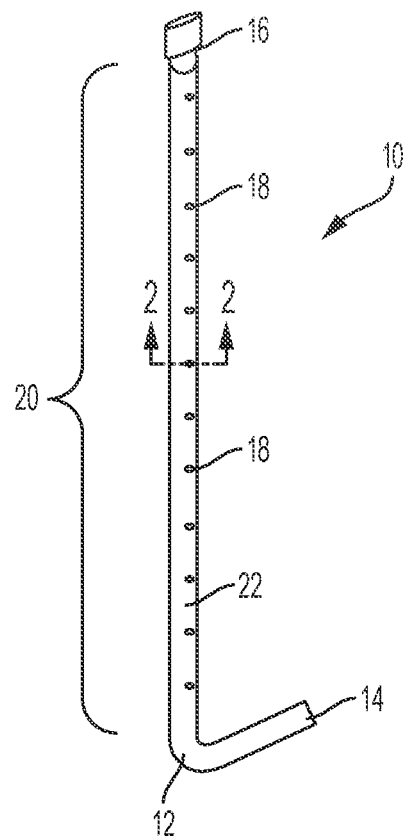
FIG. 1 illustrates an example pressure probe according to one or more aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

As used herein, the terms connect, connection, connected, in connection with, and connecting may be used to mean in direct connection with or in connection with via one or more elements. Similarly, the terms couple, coupling, coupled, coupled together, and coupled with may be used to mean directly coupled together or coupled together via one or more elements. Terms such as up, down, top and bottom and other like terms indicating relative positions to a given point or element may be utilized to more clearly describe some elements.

Figure 2:
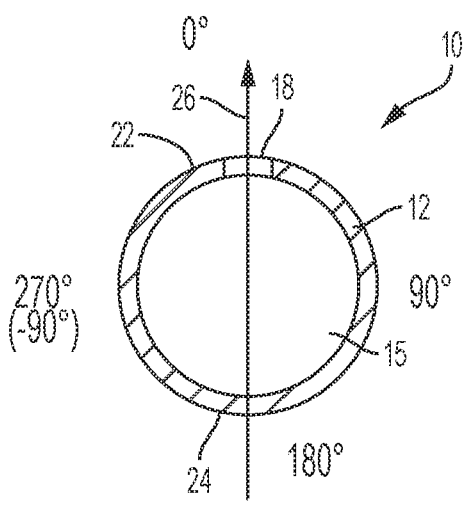
FIG. 2 is a cut-away view along the line 2-2 of FIG. 1.

FIG. 1 illustrates and an example of a pressure probe, generally denoted by the numeral 10, in accordance to one or more aspects of this disclosure. FIG. 2 is a section view along the line 2-2 of FIG. 1. Pressure probe 10 is constructed of a tube 12 having an output end 14, a terminal end 16, a plurality of pressure orifices 18, and an internal passage 15 in communication with the output end 14 and the plurality of pressure orifices 18. The plurality of pressure orifices 18 are axially aligned and spaced apart along an axial run 20 of the tube 12. The pressure orifices 18 are formed along the axial run 20 to obtain an average static pressure measurement in irregular airflow. The pressure orifices may be equally spaced from one another. The pressure probe 10 is operable in high and low airflow velocities and high and low static differential pressure applications.

The output end 14 is open to provide pneumatic communication between the pressure orifices 18 and a pressure sensor (e.g., transducer, manometer), for example through a flexible tube. The terminal end 16 is closed to the atmosphere. Closed to the atmosphere means that the terminal end does not provide a communication path between pressure orifices 18 and the external atmosphere. For example, the terminal end may be open and connected through additional piping (e.g., plastic tubing) to a pressure sensor or otherwise not providing communication with the external atmosphere. For example, with reference to FIG. 4, the terminal end 16 may be connected (e.g., through conduit) to the pressure sensor 40. The terminal end 16 may be configured to engage with a structure (e.g., duct, cabinet, rail) to orient the pressure orifices in the downstream direction relative to the airflow.

The tube 12 may be constructed of various materials in which the pressure orifices 18 can be formed and maintained in the desired orientation during use. Non-limiting examples of tube 12 include aluminum tubing, such as 3003 or 6063 aluminum alloy, which provides a rigid structure for orientation and corrosion resistance. In non-limiting example, tube 12 is constructed of an aluminum alloy and has an outside diameter (OD) of about 0.25 inches (e.g., OD tolerance +/− 0.005 in.), an inside diameter (ID) of about 0.18 inches, and a wall thickness of about 0.035 inches. In another non-limiting example, tube 12 is constructed of an aluminum alloy and has an outside diameter (OD) of about 0.25 inches (e.g., OD tolerance +/− 0.025 in.), an inside diameter (ID) of about 0.120 inches, and a wall thickness of about 0.065 inches (e.g., wall thickness tolerance +/−0.10 in.). Materials other than aluminum alloy or metal may be utilized.

The length of the axial run 20 (e.g., measurement run) may be selected for example to extend laterally across the airflow and the airflow channel (e.g., duct) in which pressure is to be measured. The pressure orifices 18 are axially aligned and formed on the same side of the tube 12, referred to as the downstream side 22. In accordance to aspects of the disclosure the downstream side 22 is on the opposite side, i.e., about 180 degrees, from the upstream side 24. In use the tube 12 is positioned in the airflow with the axial run 20 extending laterally across the airflow, shown by the arrow 26 in FIG. 2, with the upstream side 24 oriented to face upstream into the direction of airflow 26 and the downstream side 22 and pressure orifices 18 are oriented in the downstream direction. For purposes of description, the direction of the airflow 26 is designated as North and on tube 12 (FIG. 2) the intersection of the direction of airflow 26 with the downstream side 22 of the axial run of the tube and is designated as 0-degrees and the intersection of the axis of the airflow 26 with the upstream side 24 of the axial run is 180 degrees.

According to an aspect of the disclosure the pressure orifices 18 are positioned on the downstream side 22 and are of a maximum diameter so as not to extend into the airflow, i.e., the pressure orifices 18 are contained within a range of about 180 degrees so as not to extend outside of the circumference extending from about 90 degrees to 270 degrees (−90 degrees) inclusive of the 0-degree designation. It has been realized that such an arrangement permits the accurate measurement of static pressure in the airflow and reduces the clogging of the pressure orifices 18. According to aspects of the disclosure the pressure probe 10 does not have any pressure orifices other than the pressure orifices 18 that are axially aligned along the downstream side 22 of the axial run 20. In contrast a traditional pressure probe (e.g., pitot static tube) that is utilized in duct-type systems has an axial section terminating at a nosepiece forming a total pressure hole and static pressure holes that are formed on opposing sides of the axial section and oriented perpendicular to the nosepiece and the total pressure hole. In use the pitot static tube is positioned with the axial section parallel with the airflow so that the total pressure hole is oriented upstream and the static pressure holes are oriented perpendicular to the airflow direction and the static pressure holes are exposed to the airflow.

Figure 3:
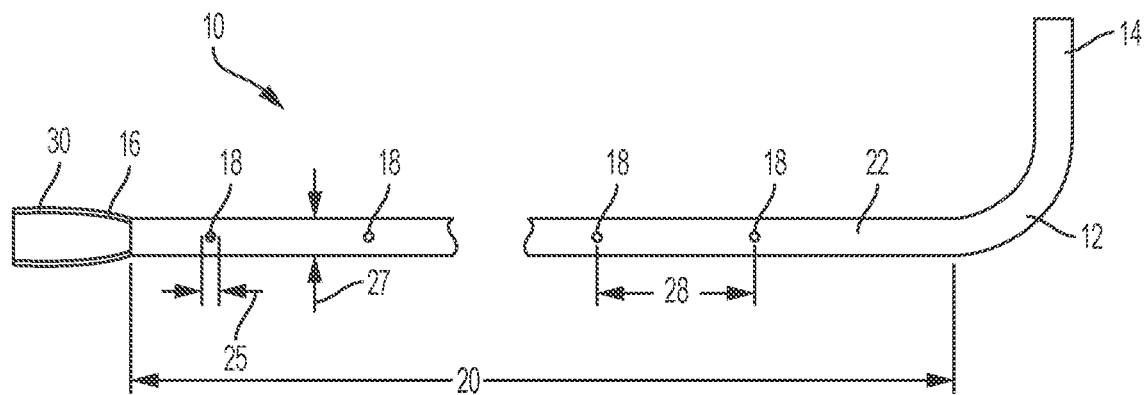
FIG. 3 illustrates an example pressure probe according to one or more aspects of the disclosure.

FIG. 3 is a non-limiting example of a pressure probe 10 constructed from a length of tubing. In this example, the pressure probe 10 was constructed from a linear length of 3003 series aluminum seamless tube 12 having a 0.250 inch OD by 0.180 inch ID by 21 inches in length. An axial measurement run 20 of 18.75 inches was selected. Eighteen pressure orifices 18 having a diameter of about 0.063 inches were drilled through the downstream side 22 of the tube 12 with a spacing 28 of about one-inch between the adjacent pressure orifices 18. The terminal end 16 is closed, for example by crimping. The terminal end 16 may also include an orientation structure 30 configured to mate with a respective structure of an airflow channel. In this example, the orientation structure 30 is in the form of a flattened tab. The orientation structure 30 is oriented relative to the downstream side 22 and the pressure orifices 18 so that when properly installed in an airflow channel the pressure orifices 18 are oriented in the downstream direction relative to the airflow. In this example a bend is formed in the tube 12 between the output end 14 and the axial run 20. Other materials of construction and dimensions may be utilized without departing from the scope of the disclosure.

According to an aspect of the disclosure, the pressure orifices 18 have a diameter 25 in the range of about 10 to 40 percent of the outside diameter 27 of the axial run 20. According to an aspect of the disclosure, the pressure orifices 18 have a diameter in the range of about 15 to 35 percent of the outside diameter of the axial run. According to an aspect of the disclosure, the pressure orifices 18 have a diameter in the range of about 20 to 30 percent of the outside diameter of the axial run 20. According to an aspect of the disclosure, the pressure orifices 18 have a diameter in the range of 28 to 22 percent of the outside diameter of the axial run. According to an aspect of the disclosure, the pressure orifices 18 have a diameter of about 25 percent of the outside diameter of the axial run.

Figure 4:
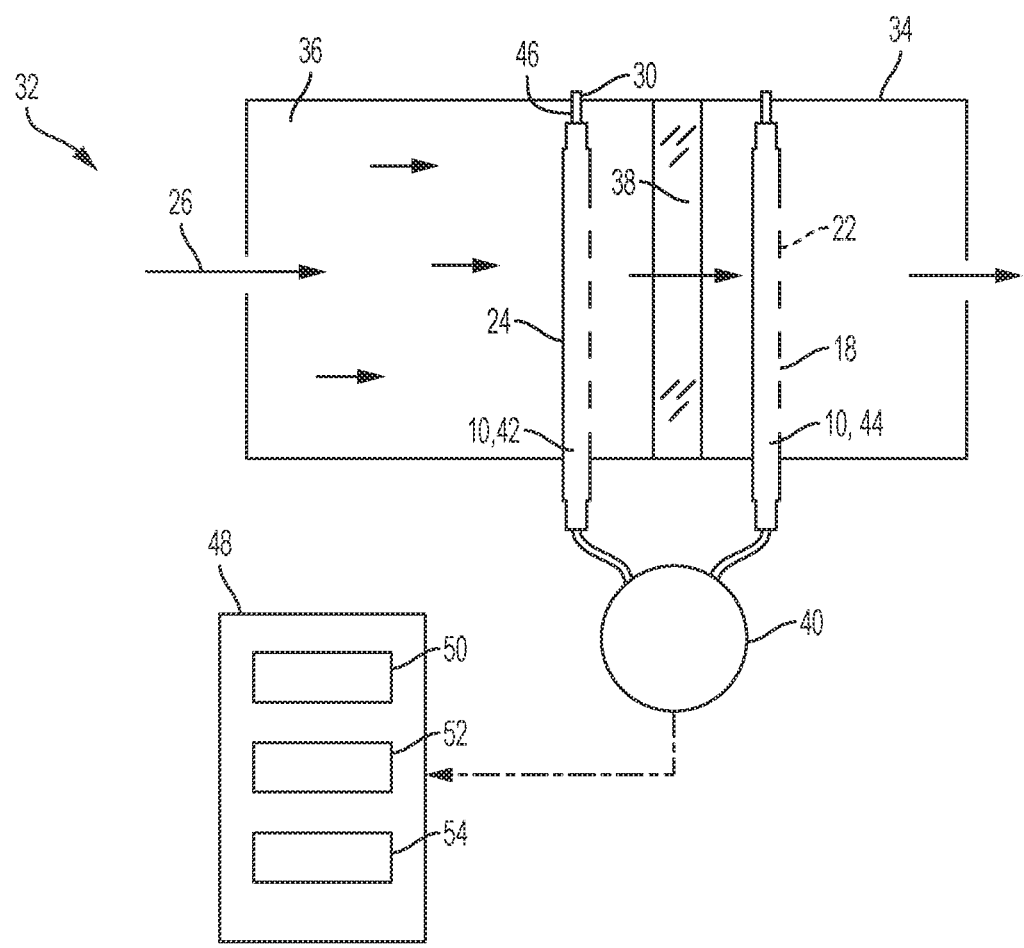
FIG. 4 illustrates an example climate control system according to one or more aspects of the disclosure.

FIG. 4 illustrates a block diagram of an example of a climate control system 32 for example a heating, ventilating and air conditioning (HVAC) system, incorporating a pressure probe 10 according to aspects of the disclosure. The climate control system 32 includes a structure 34 (e.g., duct, housing) forming an airflow channel 36 disposing a unit 38 across which the airflow 26 passes. Non-limiting examples of units 38 include air filters, enthalpy wheels, and dampers. The airflow 26 is flowing in the direction indicated by the solid arrows.

Climate control system 32 incorporates a pressure sensor 40 to measure the pressure drop across the unit 38. The pressure sensor 40 may be a conventional pressure transducer that determines the static pressure difference across the unit 38. The pressure sensor 40 may be for example an analog or digital manometer having a first and a second pressure input ports. The pressure sensor 40 includes a first pressure probe 10 providing a first pressure input 42 and a second pressure probe 10 providing a second pressure input 44, In FIG. 4 the first pressure input 42 is located on the upstream side of the unit 38 relative to the direction of airflow 26 and the second pressure input 44 is located on the downstream side of the unit 38.

Each of the pressure probes 10 for the first and second pressure inputs 42, 44 are oriented so that the axial run 20 extends laterally across the airflow channel 36 with the upstream side 24 facing into airflow 26 and the pressure orifices 18 oriented downstream so that the pressure orifices are on the backside of the pressure probe tube 12 shielded from the airflow 26. An orientation structure 30, for example at the terminal end of the pressure probe, may mate with a cooperative orientation structure 46 (e.g., slot, rails, etc.) disposed with the structure 34 to facilitate installing and maintaining the pressure probes in the desired orientation.

Figure 5:
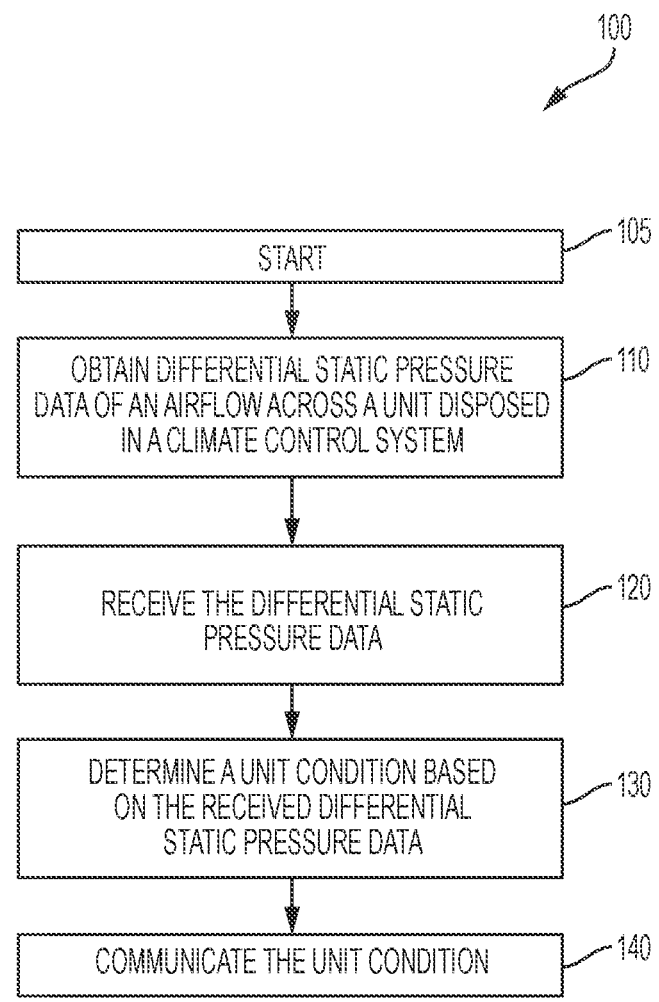
FIG. 5 illustrates a flow diagram of an example method of monitoring according to one or more aspects of the disclosure.

With additional reference to FIG. 5, the pressure sensor 40 may be utilized for example in a monitoring system (e.g., method 100) to provide feedback data to indicate conditions of the unit 38. According to an aspect of the disclosure the climate control system 32 includes a controller 48 that is coupled to the pressure sensor 40 to monitor the pressure sensor 40. The controller 48 may visually display or otherwise communicate to a human user or another controller the measured differential static pressure data and/or a condition of the unit associated with the measured differential static pressure data. Though the pressure sensor 40 is shown as a separate component from the controller 48, it should be understood that they may both be incorporated into a single unit. The controller 48 may have a diagnostics table stored in memory of the controller 48 for determining conditions. The values in the table may be selected based on the differential static pressure properties, which may be known for example at the time of manufacture. The conditions of the unit 38 may include for example a dirty filter or enthalpy wheel, a degree of a dirty filter or enthalpy wheel, and a filter or enthalpy wheel life value, such as a remaining enthalpy wheel or filter life value.

The controller 48 may include an interface 50 that may be configured to receive and transmit the feedback data. The interface 50 may be a conventional interface that is used to communicate (i.e., receive and or transmit) data. The controller 48 may also include additional components typically included within a controller for a HVAC unit, such as a power supply or power port.

The illustrated controller 48 also includes a processor 52 and a memory 54. The memory 54 may be a conventional memory typically located within a microcontroller that is constructed to store data and computer programs. The memory 54 may store operating instructions to direct the operation of the processor 52 when initiated thereby. The operating instructions may correspond to algorithms that provide the functionality of the schemes disclosed. herein. The processor 52 may be a conventional processor such as a microprocessor. The interface 50, processor 52 and memory 54 may be coupled together via conventional means to communicate information.

FIG. 5 illustrates a flow diagram of a method 100 of monitoring a condition of a unit 38 in a climate control system 32 according to aspects of the disclosure. With additional reference to FIGS. 1-4, the method 100 begins at a block 105 at the start-up of a climate control system, e.g. climate control system 32. Differential static pressure data of airflow across a unit 38 disposed in a climate control system is obtained at block 110. The differential static pressure data may be obtained by a first pressure probe 10 positioned upstream of the unit and a second pressure probe 10 positioned downstream of the unit, wherein each of the first and the second pressure probes include a tube having an output end, a closed terminal end, and an axial run 20, and pressure orifices 18 axially aligned along a downstream side 22 of the axial run, wherein the axial run is positioned laterally across the airflow channel and the downstream side and the pressure orifices are oriented in the downstream direction. A controller 48 receives (block 120) the differential static pressure data from the pressure sensor 40. The controller may determine (block 130) a condition of the unit based on the differential static pressure across the unit. At block 140 the controller communicates the unit condition.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A climate control system, comprising:
a structure forming an airflow channel;
a unit disposed in the structure across which airflow passes in a downstream direction; and
a pressure sensor comprising a first pressure probe positioned in the airflow channel upstream of the unit and a second pressure probe positioned in the airflow channel downstream of the unit, wherein each of the first and the second pressure probes comprises:
a tube having an output end, an internal passage and an axial run; and
pressure orifices equally spaced from one another and axially aligned along a downstream side of the axial run, wherein the axial run is positioned laterally across the airflow channel with the downstream side of the axial run and the pressure orifices oriented in the downstream direction.

2. The climate control system of claim 1, wherein an upstream side of the axial run opposite from the downstream side of the axial run does not comprise a pressure orifice.

3. The climate control system of claim 1, wherein the pressure orifices have a diameter of 10 to 40 percent of an outside diameter of the axial run.

4. The climate control system of claim 1, wherein the pressure orifices have a diameter of 25 percent of an outside diameter of the axial run.

5. The climate control system of claim 1, wherein the axial run has an outside diameter of 0.250 inches; and
the pressure orifices have a diameter of about 15 to 35 percent of an outside diameter of the axial run.

6. The climate control system of claim 1, wherein the axial run has an outside diameter of 0.250 inches;
the pressure orifices have a diameter of 15 to 35 percent of an outside diameter of the axial run; and
an upstream side of the axial run opposite from the downstream side of the axial run does not comprise a pressure orifice.

7. The climate control system of claim 1, wherein the tube is rigid.

8. A climate control system, comprising:
a structure forming an airflow channel;
a unit disposed in the structure across which airflow passes in a downstream direction; and
a pressure sensor comprising a first pressure probe positioned in the airflow channel upstream of the unit and a second pressure probe positioned in the airflow channel downstream of the unit, wherein each of the first and the second pressure probes comprises:
a tube having an output end, an internal passage and an axial run;
pressure orifices axially aligned along a downstream side of the axial run, wherein the axial run is positioned laterally across the airflow channel with the downstream side of the axial run and the pressure orifices oriented in the downstream direction; and
wherein the pressure orifices are equally spaced from one another along the downstream side of the axial run and comprise a maximum diameter that does not extend into the airflow.

9. The climate control system of claim 8, wherein an upstream side of the axial run opposite from the downstream side of the axial run does not comprise a pressure orifice.

10. The climate control system of claim 8, wherein the pressure orifices have a diameter of 10 to 40 percent of an outside diameter of the axial run.

11. The climate control system of claim 8, wherein the pressure orifices have a diameter of 25 percent of an outside diameter of the axial run.

12. The climate control system of claim 8, wherein the axial run has an outside diameter of 0.250 inches; and
the pressure orifices have a diameter of about 15 to 35 percent of an outside diameter of the axial run.

13. The climate control system of claim 8, wherein the axial run has an outside diameter of 0.250 inches;
the pressure orifices have a diameter of 15 to 35 percent of an outside diameter of the axial run; and
an upstream side of the axial run opposite from the downstream side of the axial run does not comprise a pressure orifice.

14. The climate control system of claim 8, wherein the tube is rigid.

15. A climate control system, comprising:
a structure forming an airflow channel;
a unit disposed in the structure across which airflow passes in a downstream direction; and
a pressure sensor comprising a first pressure probe positioned in the airflow channel upstream of the unit and a second pressure probe positioned in the airflow channel downstream of the unit, wherein each of the first and the second pressure probes comprises:
a tube positioned in the airflow channel having an output end, an internal passage and an axial run; and
pressure orifices equally spaced from one another and axially aligned along a downstream side of the axial run and comprise a maximum diameter that does not extend into the airflow.

16. The climate control system of claim 15, wherein the axial run is positioned laterally across the airflow channel with the downstream side of the axial run and the pressure orifices oriented in the downstream direction.

17. The climate control system of claim 15, wherein an upstream side of the axial run opposite from the downstream side of the axial run does not comprise a pressure orifice.

18. The climate control system of claim 15, wherein the pressure orifices have a diameter of 10 to 40 percent of an outside diameter of the axial run.

19. The climate control system of claim 15, wherein the pressure orifices have a diameter of 25 percent of an outside diameter of the axial run.

* * * * *